INVENTOR.
James R. Thurston
BY
Thomas W. Brennan

Nov. 22, 1966

J. R. THURSTON 3,286,472

ROCKET MOTOR AND IGNITION SYSTEM

Filed Feb. 24, 1964

*INVENTOR.*
James R. Thurston

BY
Thomas W. Brennan

INVENTOR.
James R. Thurston
BY
Thomas N. Brennan

United States Patent Office 3,286,472
Patented Nov. 22, 1966

3,286,472
ROCKET MOTOR AND IGNITION SYSTEM
James R. Thurston, Brigham City, Utah, assignor to Thiokol Chemical Corporation, Bristol, Pa., a corporation of Delaware
Filed Feb. 24, 1964, Ser. No. 346,656
4 Claims. (Cl. 60—256)

This invention relates to rocket motors. More particularly it relates to ignition systems for solid propellant rocket motors and rocket motors constructed to operate with increased reliability, safety and efficiency directly attributable thereto.

In rocket motors in general, to achieve efficient use of propellant and predictable performance, a prime requirement is that operating (chamber) pressure be established with minimum delay. In present day motors, especially the solid propellant perforated charge type, this result is achieved by igniting the entire propellant surface as swiftly as possible, primarily by use of an igniter or ignition system which generates high velocity gases and is, in reality, a miniature rocket motor. However, in the larger solid propellant motors (one million pounds thrust and larger), the ignition surface areas are vastly increased and require other, more satisfactory, means of obtaining ignition. Scaled-up models of conventional ignition devices present major manufacturing, handling, and storage problems because of their increased size and weight. Other systems, for example, ground or launcher retained systems, proposed for ignition of large solid propellant motors, while operatively satisfactory, are more applicable to multi-motor boosters and the like, and involves the fabrication of more complex launching and test facilities. Mere enlargement of existing ignition devices does not always provide the high temperature gases necessary to fill the considerable voids (perforations or hollow cores) inside these solid propellant rocket motors, hence, ignition of the entire propellant surface is difficult to achieve with the desirable swiftness, and when achieved, tends to result in severe ignition shock which damages the remaining, unburned, propellant charge.

The present invention overcomes these difficulties by providing a consumable means mounted within the combustion chamber of a rocket motor which temporarily confines burning to one section thereof until sufficient pressure has been reached, whereby this section of the combustion chamber becomes a part of a single, enlarged ignition system to smoothly and reliably ignite the remaining propellant in the motor.

Accordingly, it is an object of this invention to provide an improved rocket motor having means for smooth and safe ignition thereof.

Another object of this invention is to provide an improved rocket motor ignition system which accomplishes reliable and reproducible ignition thereof with correspondingly minimal increase in weight to the motor.

Still another object of this invention is to provide an improved rocket motor capable of being ignited rapidly and achieving operating pressure swiftly while minimizing dangers due to ignition shock associated therewith.

A still further object of the invention is to provide an ignition system useful in very large solid propellant rocket motors which does not appreciably change the ratio of inert (non-burning) weight to consumable weight thereof.

Still another object is to provide an improved solid propellant rocket motor ignition system which is operatively combined with a portion of the motor to achieve improved reliability, safety and predictability of performance thereof.

Other objects and advantages of the invention will become apparent from the following detailed description when read with reference to the accompanying drawings wherein corresponding parts are designated by identical characters, and in which.

Figure 1:
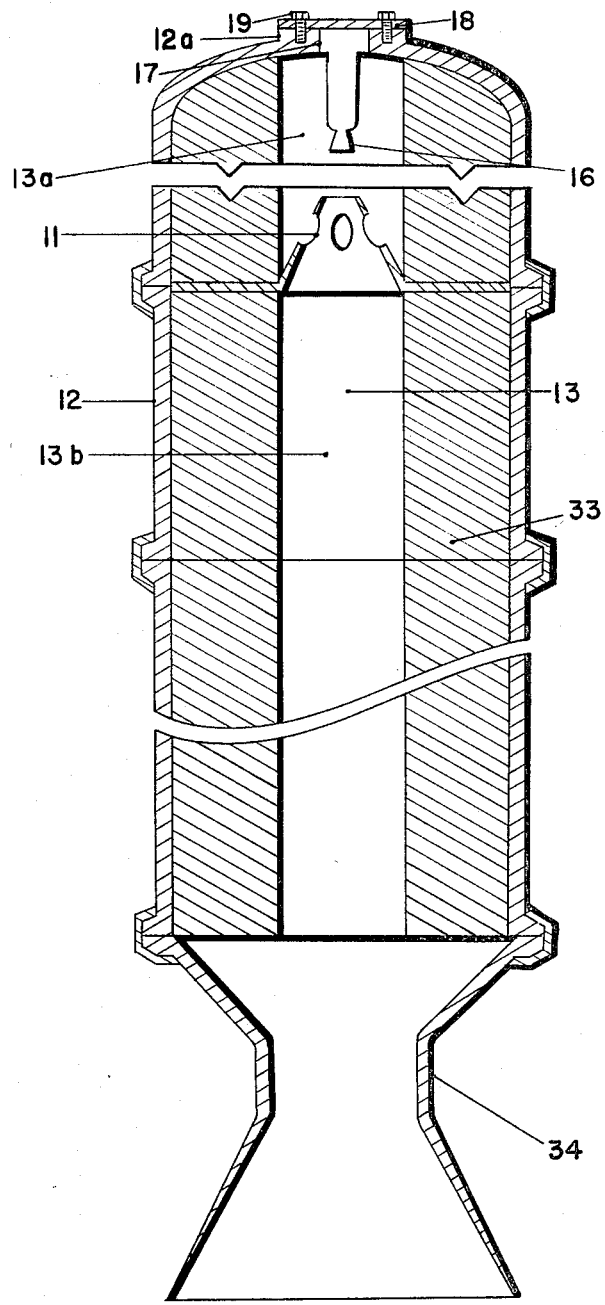
FIGURE 1 is a longitudinal section of a solid propellant rocket motor of the present invention.
Figure 3:
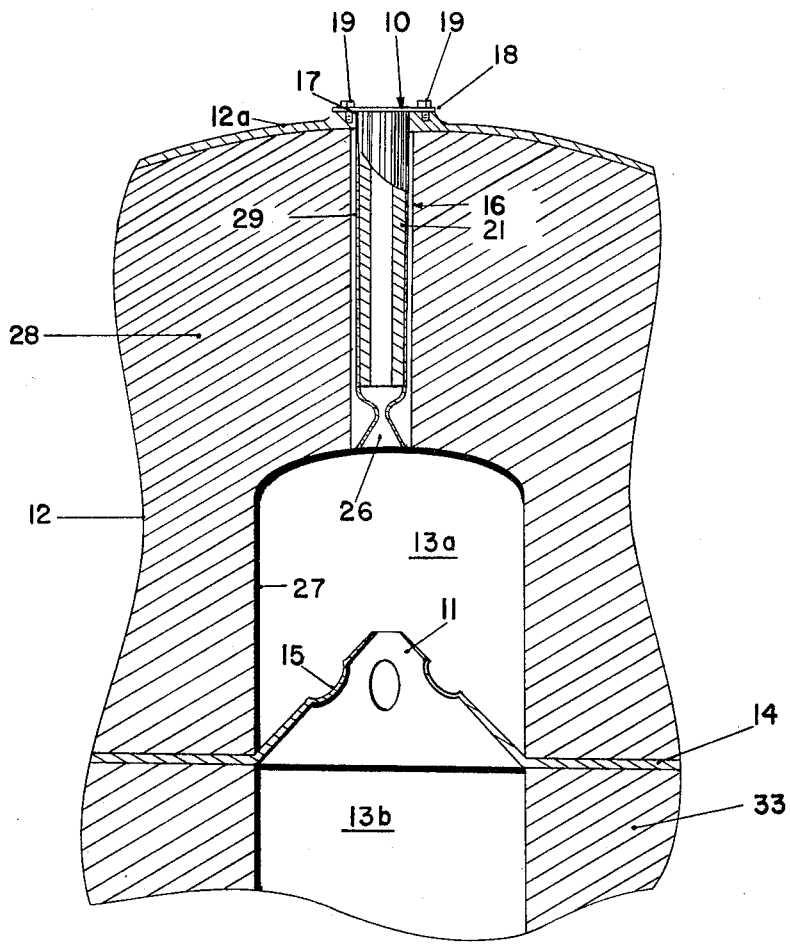
FIGURE 3 is a fragmentary sectional view illustrating in detail the invention of FIG. 1.

Referring now to FIGS. 1 and 3, there is shown therein an embodiment of the invention installed in a segmented rocket motor 12, particularly in the head end 12–a thereof, and comprised of an ignition system 10. Ignition system 10 is comprised of a baffle or chamber divider 11 of generally frusto-conical shape having its apex facing head end 12–a of rocket motor 12, and a pyrotechnic or igniting device 16. Baffle or chamber divider 11 is positioned in the combustion chamber 13 of motor 12 near head end 12–a by means of annular flange 14 clamped or mounted between two segments of the segmented rocket motor 12 for which this form of the invention is most useful.

Baffle or chamber divider 11 contains therein several flow controlling perforations, orifices or nozzles 15, the purpose of which will be hereinafter described. As above stated, baffle 11 when mounted in combustion chamber 13 divides chamber 13 into two sections or sub-chambers 13–a and 13–b. Mounted in head end 12–a of rocket motor 12 and protruding into chamber 13–a through igniter port 17, is a pyrotechnic or igniting device 16. Igniter 16 is comprised (FIG. 3) of an outer shell 29 of consumable material, for example, aluminum, magnesium, glass fiber, plastic, etc., which surrounds and contains an ignitable material or propellant 21 for production of high temperature gas, and a gas flow acceleration nozzle or outlet 26. Igniter 16 is attached to head end 12–a by any well known means, for example, flange cap 18 and bolts 19. As will be hereinafter explained, baffle 11 and igniter 16 are cooperatively operable to achieve a unique and desirable result.

Figure 4:
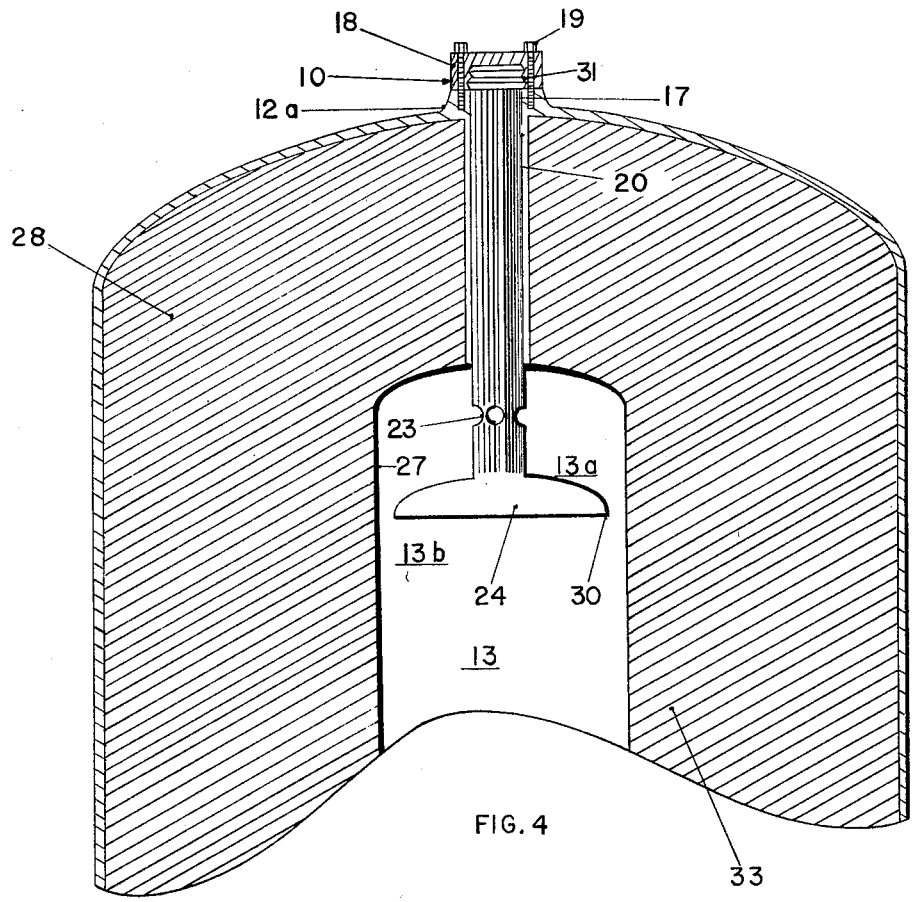
FIGURE 4 is a sectional view similar to FIG. 3 showing another form of the ignition system of the invention.
Figure 5:
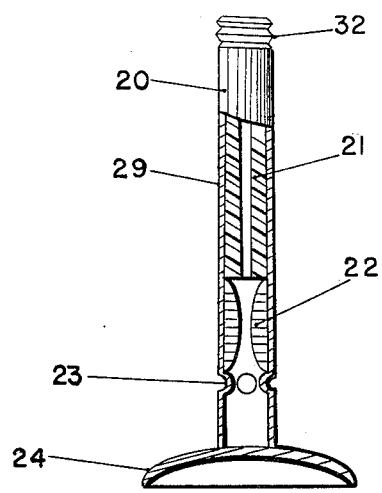
FIGURE 5 is a view, partially in section, of a portion of the invention set forth in FIG. 4.

Referring now to FIGS. 4 and 5, there is set forth therein a second embodiment of the invention wherein ignition system 10 is comprised of a baffle deflector 24 integrally connected to igniting or pyrotechnic device 20. In FIG. 5, igniter 20, outer shell 29, again fabricated of consumable material as above stated contains pyrotechnic or high temperature gas producing propellant 21, gas flow directing and/or accelerating nozzle 22, gas exit ports or orifices 23 therein and provides attachment for deflector baffle 24 which depends therefrom.

The invention in the form described in FIG. 4 (and FIG. 5) is primarily useful in practice, as will be later more fully explained, in large solid propellant motors of the monolithic or single propellant charge or grain type.

In attachment to motor 12, the invention of FIG. 4, ignition system 10 is inserted in igniter port 17 from inside motor case 12 head end 12–a until threaded end 32 of igniter 20 protrudes therefrom. Cap 18 is assembled on end 32 by means of mating threads 31 therein and the assembled parts are bolted to head end 12–a by bolts 19. When installed as shown, ignition system 10, baffle deflector 24 divides chamber 13 into two sub-chambers 13–a and 13–b with annular passage 30 therebetween.

In fabricating the invention it is contemplated that those parts extending into combustion chamber 13, for example, conical baffle 11 including flange 14, deflector 24, nozzle 22 and casing 29 are to be of consumable material. It is further desired to achieve the burning of these elements as uniformly as possible, and for this purpose, as an example, the thickness of baffle 11 is progressively increased in the downstream direction. Baffle deflector 24 thickness is decreased radially from the centerline of rocket motor 12.

Alternatively baffle deflector 24 can be fabricated by a pressure molding process from epoxy resin glass fiber materials as an integral piece and attached to igniter shell 29 by bonding or molding in place. In this instance, igniter shell 29 is inserted externally in port 17 and bolted to head end 12–a as in FIG. 3.

Figure 2:
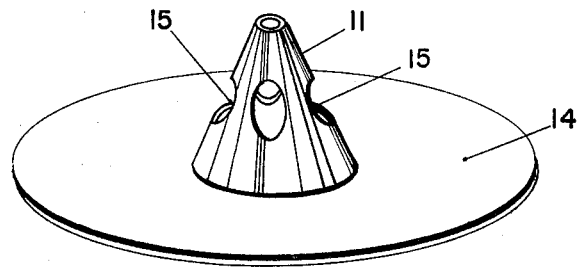
FIGURE 2 is a perspective view of part of one form of the ignition system of the invention.

In operation of the invention of FIGS. 2 and 3, combustible material in igniter device 16 is ignited by means (not shown) well known to those skilled in the art. The hot gases derived therefrom are exhausted through nozzle 26 into a sub-chamber 13–a, being accelerated thereby, and ignite propellant 28 at surface 27. Sub-chamber 13–a becomes pressurized by gases resulting from the combustion of head end propellant 28 due to restriction to flow thereof from chamber 13–a presented by orifices 15 in baffle 11. As a result sub-chamber 13–a, propellant 28 in head end 12–a in conjunction with baffle 11 and flow control orifices 15 therein, combine to form a secondary, large volume, high temperature gas generator which permits rapid ignition of the remaining propellant 33. Further, these elements, in combination with the case of motor 12 and thrust nozzle 34 (FIG. 1), combine to form an improved solid propellant rocket motor which operatively excels over prior art motors since it is capable of more rapidly igniting and attaining operation combustion chamber pressure without experiencing the harmful effects of excessive ignition shock than heretofore was possible.

An additional advantage of the ignition system of this invention and the improved motor, aside from improved reliability of ignition and increased efficiency in propellant consumption, is the achievement of these desirable characteristics with relatively little increase in weight. Prior art motors of comparable size necessarily resort to igniters of correspondingly larger size in order to provide sufficient volumes of high temperature gas to effect satisfactory ignition. Further, upon completion of its function to ignite the prior art motor, it remains therewith as dead weight thereby increasing the ratio of the motor inert (non-consumable and therefore non-energy providing) weight to consumable weight.

Similarly with regard to the ignition system and motor of the invention of FIGS. 4 and 5, propellant or ignitable material 21 in igniting device 20 is ignited by means (not shown) well known to those skilled in the art. Gases derived from the burning combustible material 21 are exhausted through nozzle 22 and orifices or flow constrictors 23 into head end chamber 13–a being accelerated thereby, to ignite propellant 28 at surface 27. Chamber 13–a becomes pressurized as a result of the increased amount of high temperature gases derived from combustion of propellant 28. From pressurized chamber 13–a the gases are exhausted through annular passage 30 into downstream chamber 13–b, being accelerated therethrough, and the remaining propellant 33 in motor 12 is thereby ignited smoothly, rapidly and safely with high reliability.

What is presented therefore to the art as set forth above, is an improved rocket motor and an ignition system therefor which is at once of lighter weight over comparable motors, of increased reliability in ignition and achievement of operating condition, is safer from the standpoint of starting and is capable of being ignited rapidly with minimal ignition shock.

Obviously from the foregoing, many modifications and variations of the present invention are possible in the light of the above set-forth description and teachings. It is therefore to be understood that within the scope of the appended claims the invention may be practiced, otherwise than as specifically described.

What is claimed is:

1. A solid propellant rocket motor and an ignition system therefor comprising, in combination, a casing, a perforated solid propellant charge containing a combustion chamber having a head end in said casing, said ignition system comprising a consumable flow restrictor means and a combustible material containing igniter mounted in said head end and extendible interiorly of said chamber, said restrictor means defining a sub-chamber with said chamber head end, means in said igniter for accelerating the high temperature gas obtained from combustion of said combustible material into said sub-chamber to ignite the solid propellant in the head end of said combustion chamber, and a radially extending, substantially circular baffle attached to said igniter means, said baffle forming an annular flow passage between the solid propellant surface in said chamber and the outer edge of said baffle to restrict gas flow from said sub-chamber until ignition of said head end propellant occurs producing an increased amount of high temperature gases to ignite the remainder of said solid propellant and consume said restrictor means.

2. An ignition system for a perforated charge containing solid propellant rocket motor comprising an igniter mounted in the head end of said rocket motor, ignitable material in said igniter means for producing initial high temperature gas, a deflector baffle attached to said igniter means and extending interiorly in the head end of said perforated charge in said rocket motor, said deflector baffle radially extendible in said motor to form an annular passage between the internal surface of said propellant charge and the outer extremity of said deflector baffle, and means in said igniter means between said deflector baffle and said ignitable material for accelerating said initial high temperature gas from said ignitable material into the head end of said motor for ignition of propellant in said head end, said ignited propellant producing increased high temperature gas to consume said deflector baffle and ignite the remaining propellant in said motor.

3. The rocket motor of claim 1 wherein the circular baffle has radially decreasingly varying thickness.

4. The ignition system of claim 2 wherein the deflector baffle has radially decreasingly varying thickness.

References Cited by the Examiner

UNITED STATES PATENTS

| 2,976,680 | 3/1961 | Kobbeman | 60—39.82 X |
| 3,170,287 | 2/1965 | Adelman | 60—39.82 X |
| 3,172,255 | 3/1965 | Priapi | 60—39.82 X |
| 3,173,251 | 3/1965 | Allen et al. | 60—39.47 X |
| 3,177,651 | 4/1965 | Lawrence | 60—39.82 X |

MARK NEWMAN, *Primary Examiner.*

CARLTON R. CROYLE, *Examiner.*